Inventor
LAWRENCE L. EDWARDS,

Inventor
LAWRENCE L. EDWARDS,

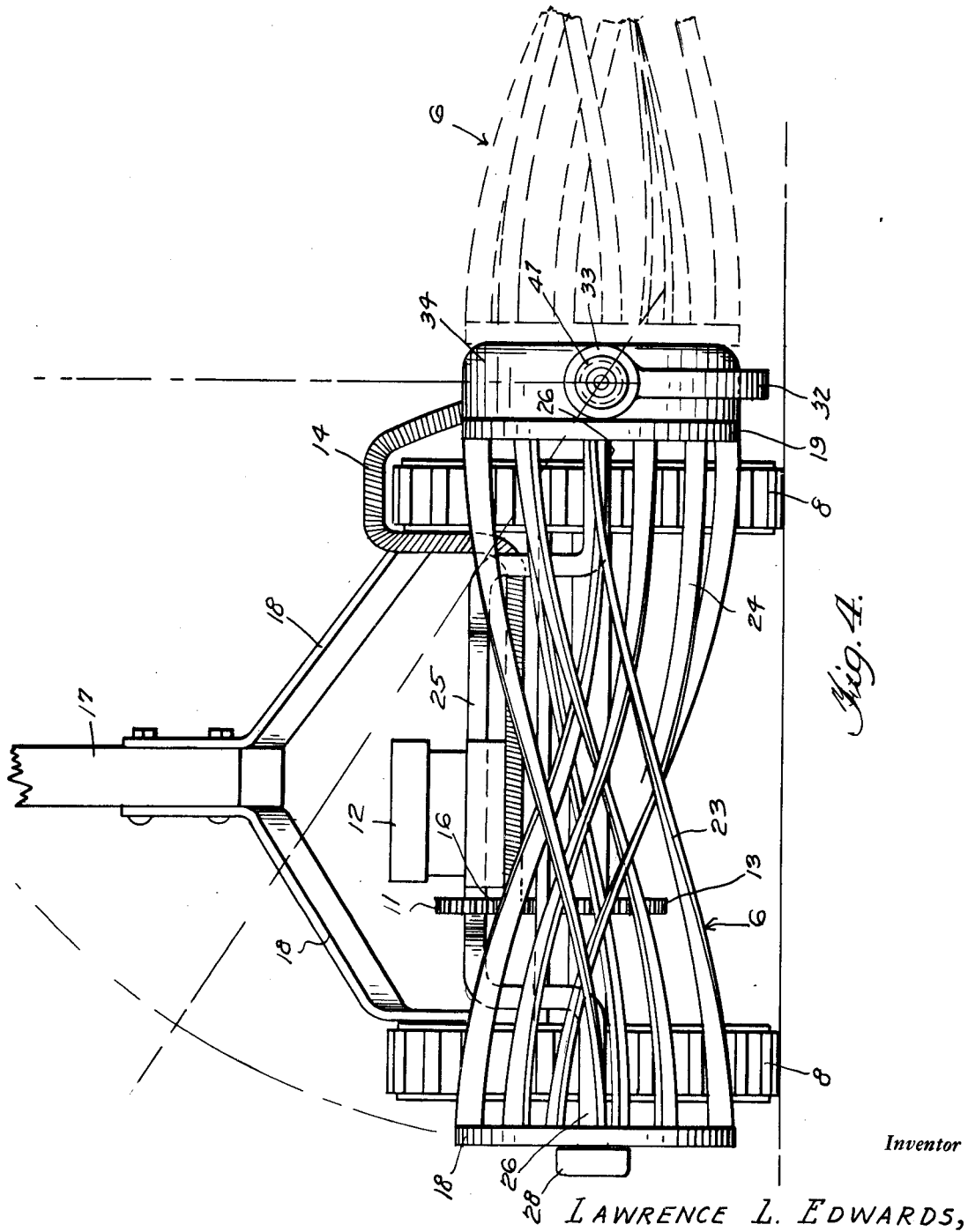

Feb. 2, 1943     L. L. EDWARDS     2,309,635
MOWER
Filed Jan. 23, 1942     4 Sheets-Sheet 4
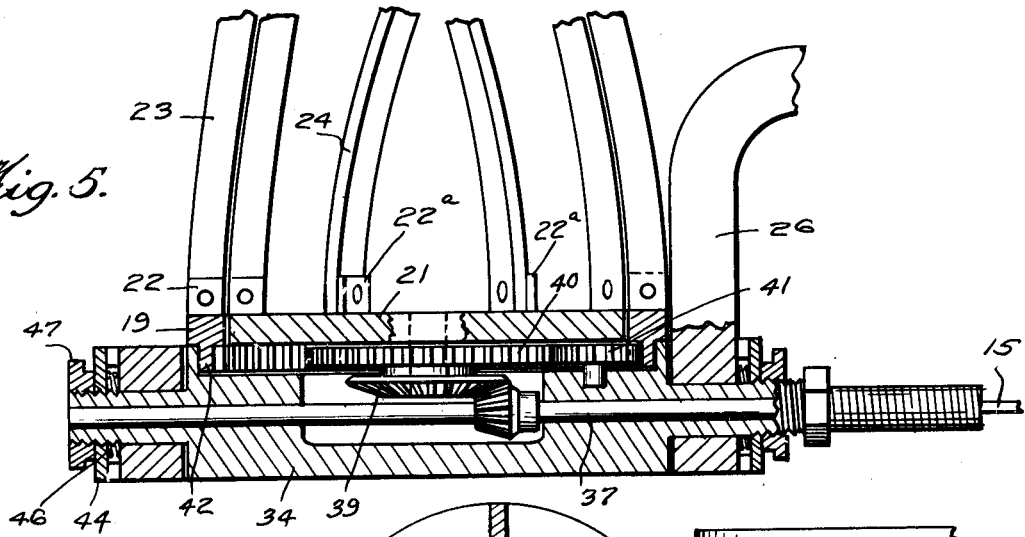
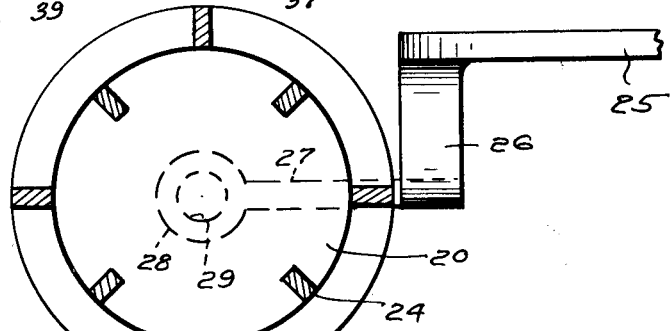
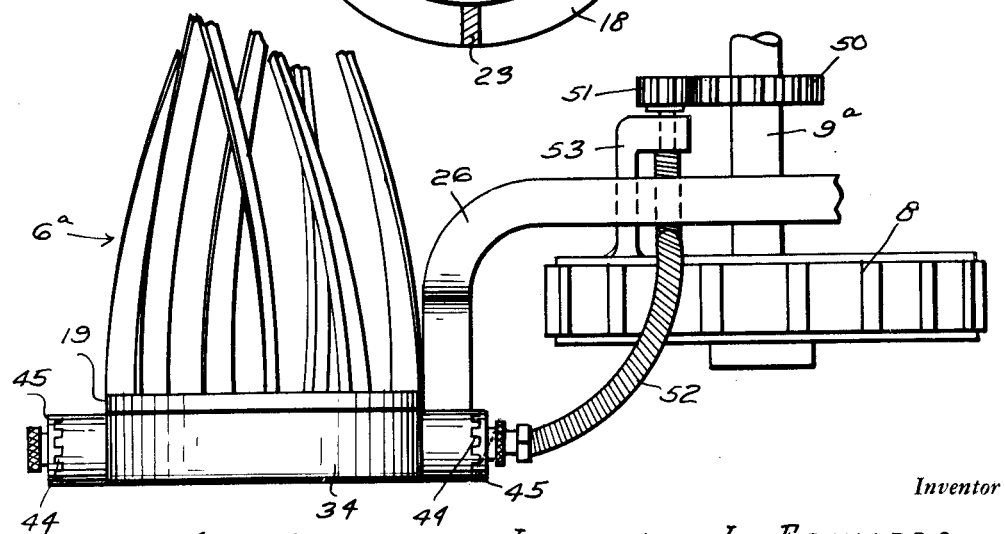
Inventor
LAWRENCE L. EDWARDS, Patented Feb. 2, 1943

2,309,635

UNITED STATES PATENT OFFICE 2,309,635

MOWER

Lawrence L. Edwards, Cleveland, Ohio

Application January 23, 1942, Serial No. 427,997

2 Claims. (Cl. 56—249)

This invention relates to new and useful improvements in cutting apparatus, and more particularly to a mower which can be used for mowing grass and trimming the sides of hedges and the like.

The principal object of the present invention is to provide a cutting machine of the character stated which can be readily adjusted from a horizontal position to a vertical position for cutting the sides of hedges and the like.

Another important object of the invention is to provide a mowing machine wherein the cutting unit can be adjusted to any desired inclination for either cutting gulleys or ridges.

Another important object of the invention is to provide a mower provided with a cutter unit which will cut to a width greater than the width of the wheeled carrier thereof.

Other objects and advantages of the invention will become apparent to the reader of the following description.

In the drawings:

Figure 4 is a fragmentary front elevational view of the machine.

Figure 5 is a fragmentary detailed sectional view taken substantially on the line 5—5 of Figure 2.

Figure 6 is a section on line 6—6 of Figure 1.

Figure 7 is a fragmentary top plan view showing an axle-type drive.

Figure 1:
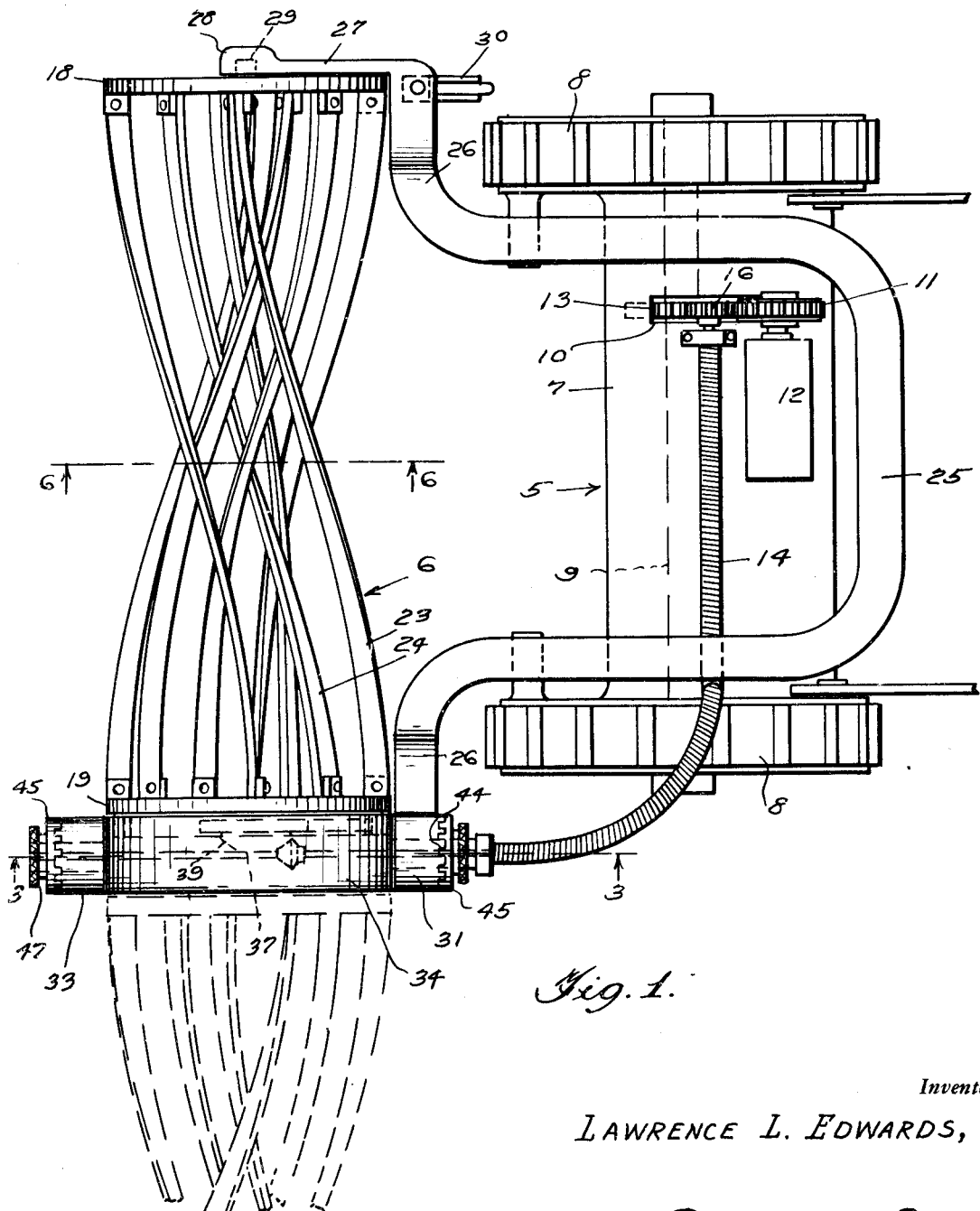
Figure 1 represents a top plan view of the mower, the cutting unit being also shown in broken lines to illustrate how it can be used at the side of the wheeled carrier.

Referring to the drawings wherein like numerals designate like parts, it can be seen in Figure 1 that numeral 5 generally refers to a wheeled carrier while numeral 6 generally refers to a cutter unit.

The carrier 5 embodies a platform 7 interposed between a pair of traction wheels 8, 8 and located above an axle 9. The plate 7 has an opening 10 therein through which a gear 11 driven by a suitable power plant 12 mounted on the platform 7 depends.

The gear 11 meshes with a gear 13 on the axle 9 and thus the axle 9 is driven.

As is clearly shown in Figure 1, a flexible conduit 14 extends longitudinally along the platform 7 and has a flexible shaft 15 therein which at one end has a pinion 16 depending through the opening 10 and in mesh with the axle gear 13. The other end of the shaft 15 extends to driving connection with the cutter unit 6.

Obviously, the wheeled carrier 5 has a suitable hand bar 17 extending therefrom and connected to said carrier by a strap 18.

Now, referring to the cutter unit 6, it can be seen that this unit embraces a pair of annular members 18, 19 in which discs 20 and 21, respectively, are rotatable.

Lugs are provided on the opposed faces of the annular members 18, 19, the same being denoted by numeral 22 and extending between the annular members 18, 19 and connected to the lugs 22 are cutter blades 23 which are twisted in a spiral fashion, as is clearly represented in Figures 1 and 4.

The disc members 20, 21 are likewise provided with lugs 22ᵃ and spirally fashioned blades 24 extend between the disc members 21 and are connected to the lugs 22ᵃ at their ends, as in the manner substantially shown in Figure 5.

The blades 23 and 24 turn in opposite directions thus affording a shearing action. This will be described further hereinafter.

The means for supporting the cutter reel just described embodies a U-shaped frame 25, the leg portions of which are bent laterally, as at 26, one portion 26 having an arm 27 terminating in a bearing 28 for receiving a trunnion 29 projecting from the outside of the disc 20. A caster wheel 30 is located on the portion 26 adjacent the arm 27.

The other portion 26 of the frame 25 terminates in a bearing 31 from which forwardly projects a yoke 32 terminating at its forward end in a bearing 33.

Numeral 34 denotes a hollow cylindrical head having bored trunnions 35, 36 protruding therefrom and through the bearings 31, 33, respectively. Extending diametrically through the head 34 and through the trunnions 35, 36 is a shaft 37 having a beveled pinion 38 meshing with a beveled gear 39 which carries the disc 21 (see Fig. 5). Also carrying the disc 21, as seen in Figure 5, is a gear 40 which meshes with a pinion 41, the latter in turn meshing with a ring gear 42 formed on the annular member 19 (see Fig. 5).

Obviously, as the shaft 37 is operated by the flexible shaft 15 to which it is attached, the blades 23 and 24 will be rotated in opposite directions affording a shearing action.

Figure 3:
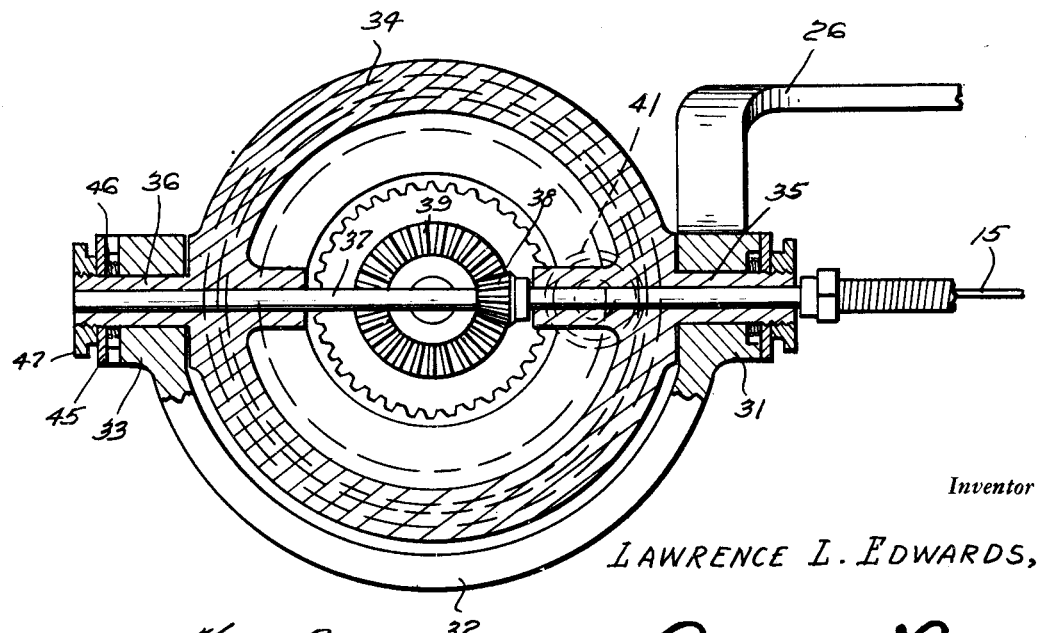
Figure 3 is a vertical sectional view taken substantially on the line 3—3 of Figure 1.

Means for holding the reel in cutting position regardless of the degree of inclination to be cut, is represented at the two bearings 31, 33 (see Figs. 3 and 7).

The other ends of the bearings 31, 33 are formed with teeth 44 with which teeth on adjacent clutch members 45 are meshable. Circumscribing the trunnions 35, 36 are compression springs 46, these being interposed between the corresponding bearings and the clutch plates 45 so as to hold the clutch plates 45 spaced from the adjacent bearings and the teeth thereon when the nuts 47 on the threaded outer ends of the trunnions 35, 36 are loosened.

Figure 2:
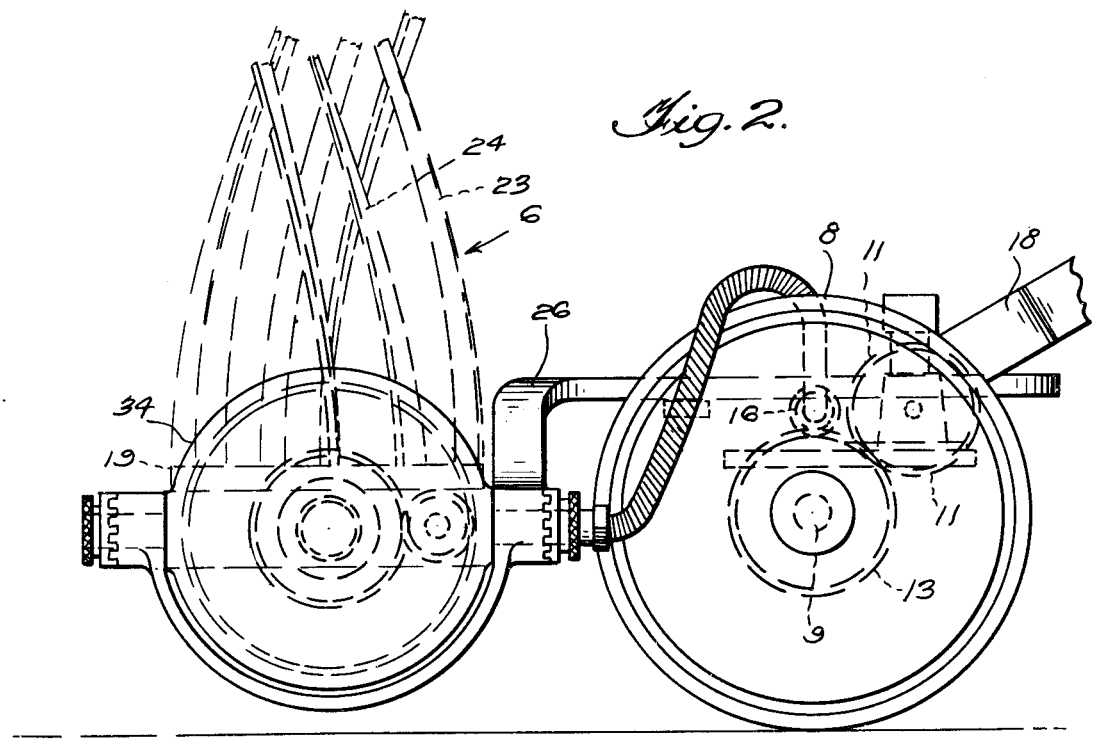
Figure 2 is a fragmentary side elevational view of the machine.

Obviously, when the clutch plates 45 are loosened as a result of unscrewing the nuts 47, the cutting reel can be swung to any inclination desired, as represented in Figures 1, 2 and 4, and subsequently secured in this position for operation.

In Figure 7 a slightly modified form of the invention is shown wherein an axle 9ª of the wheeled carrier has a gear 50 driving a pinion 51 which in turn operates a flexible shaft trained through a flexible conduit 52, one end of which is anchored on a bracket 53. The flexible shaft drives the cutter unit 6ª in the same manner as before described, this type of machine representing an axle drive instead of a power plant equipped machine, as in the first form of the invention.

While the foregoing specification sets forth the invention in specific terms, it is to be understood that numerous changes in the shape, size and materials may be resorted to without departing from the spirit and scope of the invention as claimed.

Having described the invention, what is claimed as new is:

1. In a mowing machine, a wheel supported carriage, an axle rotatable with said wheels, a forwardly extending frame on said carriage including a side arm, a forwardly extending side yoke on said arm, an annular casing pivotally mounted in said yoke for swinging about a horizontal axis parallel with the path of travel of the machine, a mower reel mounted at one end on said casing for vertical swinging adjustment thereby about said axis into different set positions, and means to drive said reel in any adjusted position thereof comprising gearing in said casing, and operating connections between said axle and gearing.

2. In a mowing machine, a wheel supported carriage, an axle rotatable with said wheels, a forwardly extending frame on said carriage including a side arm, a forwardly extending side yoke on said arm, an annular casing pivotally mounted in said yoke for swinging about a horizontal axis parallel with the path of travel of the machine, a mower reel mounted at one end on said casing for vertical swinging adjustment thereby about said axis into different set positions, and means to drive said reel in any adjusted position thereof comprising gearing in said casing, and operating connections between said axle and gearing, said connections comprising a flexible shaft to which the axle is operatively connected, and a shaft extending through the pivotal connections of said casing and through said casing in the axis thereof and operated by said flexible shaft.

LAWRENCE L. EDWARDS.